(12) United States Patent
Gartrell et al.

(10) Patent No.: US 7,248,904 B2
(45) Date of Patent: Jul. 24, 2007

(54) BELT COVERING FOR A MOBILE STATION AND METHOD OF USING THE SAME

(75) Inventors: Andrew Julian Gartrell, Tarzana, CA (US); Robert A. Shepherd, Tarzana, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/280,020

(22) Filed: Nov. 16, 2005

(65) Prior Publication Data

US 2006/0121963 A1    Jun. 8, 2006

Related U.S. Application Data

(62) Division of application No. 10/783,228, filed on Feb. 19, 2004, now Pat. No. 6,999,805.

(60) Provisional application No. 60/483,780, filed on Jun. 30, 2003.

(51) Int. Cl.
*H04M 1/00* (2006.01)

(52) U.S. Cl. .............. 455/575.8; 455/575.1; 455/90.3; 455/550.1; 455/556.1; 455/347; 455/348; 379/433.01; 379/433.11; 379/437; 379/440

(58) Field of Classification Search .......... 455/575.1, 455/3, 8, 90.1–3, 556.1–2, 557, 347–349; 379/433.1, 433.11–13, 437, 440, 451–452; 361/682–684; D14/248–251
See application file for complete search history.

(56) References Cited

U.S. PATENT DOCUMENTS

| 3,770,115 | A | * | 11/1973 | Cannell | 206/508 |
| 4,834,259 | A | * | 5/1989 | Kubis et al. | 220/359.2 |
| 5,587,701 | A | * | 12/1996 | Hess | 340/541 |
| 5,613,237 | A | * | 3/1997 | Bent et al. | 455/351 |
| 5,618,041 | A | * | 4/1997 | Huang | 473/549 |
| 5,669,079 | A | * | 9/1997 | Morgan | 2/414 |
| 6,187,514 | B1 | * | 2/2001 | Kiyosawa et al. | 430/320 |
| 6,201,867 | B1 | * | 3/2001 | Koike | 379/433.11 |
| 6,303,666 | B1 | * | 10/2001 | Yorita et al. | 521/79 |
| 6,704,586 | B2 | * | 3/2004 | Park | 455/575.3 |
| 6,785,566 | B1 | * | 8/2004 | Irizarry | 455/575.8 |
| 2001/0030856 | A1 | * | 10/2001 | Wilson | 361/814 |
| 2001/0049292 | A1 | * | 12/2001 | Strawn et al. | 455/550 |
| 2002/0027768 | A1 | * | 3/2002 | Tseng et al. | 361/683 |
| 2002/0065054 | A1 | * | 5/2002 | Humphreys et al. | 455/90 |
| 2002/0085709 | A1 | * | 7/2002 | Hsu | 379/433.11 |
| 2002/0094838 | A1 | * | 7/2002 | Wang | 455/550 |

(Continued)

*Primary Examiner*—Matthew D. Anderson
*Assistant Examiner*—Tuan Tran
(74) *Attorney, Agent, or Firm*—Alston & Bird LLP (57) ABSTRACT

A mobile station including a cover assembly and a wireless telecommunications signal receiving and generating assembly. Included in the cover assembly is a belt that substantially extends around the signal receiving and generating assembly, and a connector to hold the belt closed about the signal receiving and generating assembly. The belt includes a pair of side edges which define side openings through which the signal receiving and generating assembly can be accessed. Advantageously, the belt is easily exchanged with other belts so as to vary the appearance of the mobile station. Further, the side edges are easily gripped by a user holding the mobile station. In another aspect, the belt includes an integrated key pad which overlies a plurality of key contacts of the signal receiving and generating assembly.

16 Claims, 11 Drawing Sheets

U.S. PATENT DOCUMENTS

| | | |
|---|---|---|
| 2002/0132634 A1* | 9/2002 | Hiltunen ..................... 455/550 |
| 2002/0193136 A1* | 12/2002 | Halkosaari et al. ......... 455/550 |
| 2003/0012592 A1* | 1/2003 | Min .......................... 400/490 |
| 2001/0068035 | 4/2003 | Pirila et al. |
| 2003/0068035 A1* | 4/2003 | Pirila et al. .................. 379/447 |
| 2003/0087611 A1* | 5/2003 | Pan ............................ 455/90 |
| 2003/0211835 A1* | 11/2003 | Pan et al. ................... 455/90.3 |
| 2004/0203486 A1* | 10/2004 | Shepherd et al. ........... 455/90.1 |

* cited by examiner

BELT COVERING FOR A MOBILE STATION AND METHOD OF USING THE SAME

CROSS REFERENCE TO RELATED APPLICATION

This application is a divisional of U.S. application Ser. No. 10/783,228, filed Feb. 19, 2004 now U.S. Pat. No. 6,999,805, which claims the priority of U.S. Provisional Patent Application No. 60/483,780 filed Jun. 30, 2003, both of which are incorporated herein by reference.

BACKGROUND OF THE INVENTION

1. Field of the Invention

The present invention is related to the use of covers for mobile stations (such as mobile telephones), and more particularly interchangeable covers that protect the mobile station and allow the appearance of the mobile station to be customized.

2. Description of Related Art

Participants in the mobile telephone industry are in a constant search to differentiate their telephones by making them easier to use and more aesthetically appealing. For example, mobile telephones have been developed with easily interchangeable covers. An interchangeable cover allows the user to change the appearance of the phone as desired, such as by matching the cover to an outfit.

In addition to aesthetic appearance, durability of the mobile telephone is also a concern. Originally, mobile telephones were housed in large protective cases and included large battery power supplies. Steady improvements in mobile telephone construction have resulted in much more lightweight and low-cost telephones. Typically, the more recent versions of mobile telephones have a housing constructed of a hard plastic material, such as a thermoplastic material that is heated and molded into a container for the electronic components of the telephone. Although such materials are an effective guard against most impacts resulting from drops and other blows, extraordinary impacts can result in permanent deformation of the housing.

As an additional guard against impacts, a separate cover constructed of leather or textile materials is often employed. Such materials are typically softer and more energy absorbent, dampening the shock of an impact and protecting the more brittle plastic housing. For instance, the cover may include a relatively thick, semi-rigid backing panel that is sized to cover a rear surface of the mobile telephone and includes a peripheral edge that is configured to extend forwardly from the rear surface of the telephone.

In addition, a cover may include a sling that is constructed of a relatively thin, flexible piece of leather or textile material sewn to the peripheral edge of the backing panel. The sling is shaped to conform to the contours of the front and side surfaces of the mobile telephone and forms a pocket between it and the backing panel. Defined in the sling are various openings that correspond to the key pad, screen, antenna, interface jack, etc. An upper portion of the sling includes a hook and loop connector allowing the upper portion to be extended over the upper surface of the mobile telephone and attached to a mating hook and loop connector on the backing panel. In this manner, the mobile telephone is secured within the sling.

Advantageously, the peripheral edge of the backing panel extends outwardly from the side surfaces of the mobile telephone and thereby cushions impacts. However, the relatively thin, flexible construction of the sling is not as effective at protecting the front and side surfaces of the mobile telephone. Although the thickness of the sling may be increased for further cushioning, such an increase can interfere with the accessibility of the keypad, display and other interface devices of the mobile telephone. In addition, the cover does not appear to be a part of the original telephone construction and therefore detracts from the aesthetic appearance of the mobile telephone.

Therefore, it would be advantageous to have a mobile station cover that is easily removed and reinstalled to allow the appearance of the mobile station to be customized. In addition, it would be advantageous to have a mobile station cover that protects the mobile station against impacts but does not appear to be a separately manufactured, aftermarket product and that did not interfere with the functionality of the various user-interfaces, such as the display and keypad.

BRIEF SUMMARY OF THE INVENTION

The above needs are addressed and other advantages are provided by a mobile station including a cover assembly and a wireless telecommunications signal receiving and generating assembly. Included in the cover assembly is a belt that substantially extends around the signal receiving and generating assembly, and a connector to hold the belt closed about the signal receiving and generating assembly. The belt includes a pair of side edges which define side openings through which the signal receiving and generating assembly can be accessed. Advantageously, the belt is easily exchanged with other belts so as to vary the appearance of the mobile station. Further, the side edges are easily gripped by a user holding the mobile station. In another aspect, the belt includes an integrated key pad which overlies a plurality of key contacts of the signal receiving and generating assembly.

In one embodiment, the present invention includes a cover assembly for a wireless telecommunications signal receiving and generating assembly, wherein the cover assembly includes a belt and a connector. In particular, the belt has a first end, a second end and a pair of side edges. The pair of side edges are laterally spaced from each other and extend between the first and second ends. Also included in the belt are first and second portions wherein the first portion is adjacent the first end and the second portion is adjacent the second end. Positioned between the first and second portions is a flexible portion. The flexible portion extends between the side edges and allows the first and second portions to be moved with respect to each other when moved about the flexible portion. The connector is configured to hold together the first and second ends of the belt in an adjacent relationship. In this manner, the belt can substantially extend around, and in overlying contact with, the signal receiving and generating assembly. In addition, the side edges define a pair of spaced openings exposing side portions of the signal receiving and generating assembly.

Various configurations for the belt are possible, facilitating easy exchange of different belts and protection of the signal receiving and generating assembly. For instance, the ends of the belt may be configured to be in abutting contact when held in the adjacent relationship by the connector. In this manner, the belt extends continuously around the signal receiving and generating assembly. In addition, the flexible portion of the belt may have a rounded inner surface, and the abutting ends together may define a rounded inner surface, so that the belt material may more easily conform to the outer contours of the signal receiving and generating assembly.

In another aspect, the side edges of the belt may be substantially parallel to each other so that the belt has a generally equal width along its length. Further, the side edges of the belt may be configured to partially extend over side surfaces of the signal receiving and generating assembly. Extending the side edges over the side surfaces restrains the signal receiving and generating assembly from falling out of the side openings.

The flexible portion of the belt may define an opening sized to reveal or receive a connection port, such as a interface jack, of the signal receiving and generating assembly. Other openings can also be defined in the belt, such as a display opening that is configured to extend around a display of the signal receiving and generating assembly.

Preferably, the belt has a thickness that is about equal to the height of the display, interface jack and any other plateau portions of the signal receiving and generating assembly. As a result, when the belt is applied to the signal receiving and generating assembly, the plateau portions are still easily accessible and have exposed surfaces that are flush with an outer surface of the belt. In another option, the belt may also include one or more flaps that extend over the openings and protect the underlying portions of the signal receiving and generating assembly.

In still another aspect, the belt may include an integrated key pad that is configured to be positioned over a plurality of key contacts of the signal receiving and generating assembly. Depression of the keys on the keypad will depress the underlying contacts and register inputs with the signal receiving and generating assembly.

Generally, the connector holds the ends of the belt in an adjacent relationship, and preferably in abutting contact, as discussed above. In one aspect, each of the ends of the belt defines an outwardly directed flange. In this case, the connector may be an elastic ring that is configured to extend around the two flanges so as to tightly hold the ends of the belt together.

In another embodiment, the present invention includes a mobile station having a wireless telecommunications signal receiving and generating assembly. The signal receiving and generating assembly has a front surface, a back surface and a peripheral surface extending between the front and back surfaces. In addition, a belt of the mobile station extends over the front surface, the back surface and a pair of opposite portions of the peripheral surface of the signal receiving and generating assembly. The belt includes a pair of side edges defining a pair of openings on the sides of the belt. The side openings reveal the remaining portions of the peripheral surface of the signal receiving and generating assembly over which the belt does not extend.

To further guard against impacts, the signal receiving and generating assembly may include an outer housing. Extending from the housing is at least one plateau portion, such as a display or a connection port. Preferably, the belt has an outer surface that is flush with an exposed surface of the plateau portion or portions.

The mobile station and associated cover assembly of the present invention have many advantages. For instance, the belt is easily attached and removed from the signal receiving and generating assembly, allowing quick exchange with other belts to change the appearance of the mobile station. In addition, the cover assembly provides additional protection for the signal receiving and generating assembly, especially if the belt is constructed of an impact-absorbing material. The side edges of the belt defining the side openings allow the mobile station to be easily gripped and held in the hand of a user. In addition, the side openings allow for easier bending and attachment of the belt about the housing. Matching the thickness of the belt to the raised portions, such as the display and the interface jack, provide a relatively flush, attractive outer surface of the mobile station.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
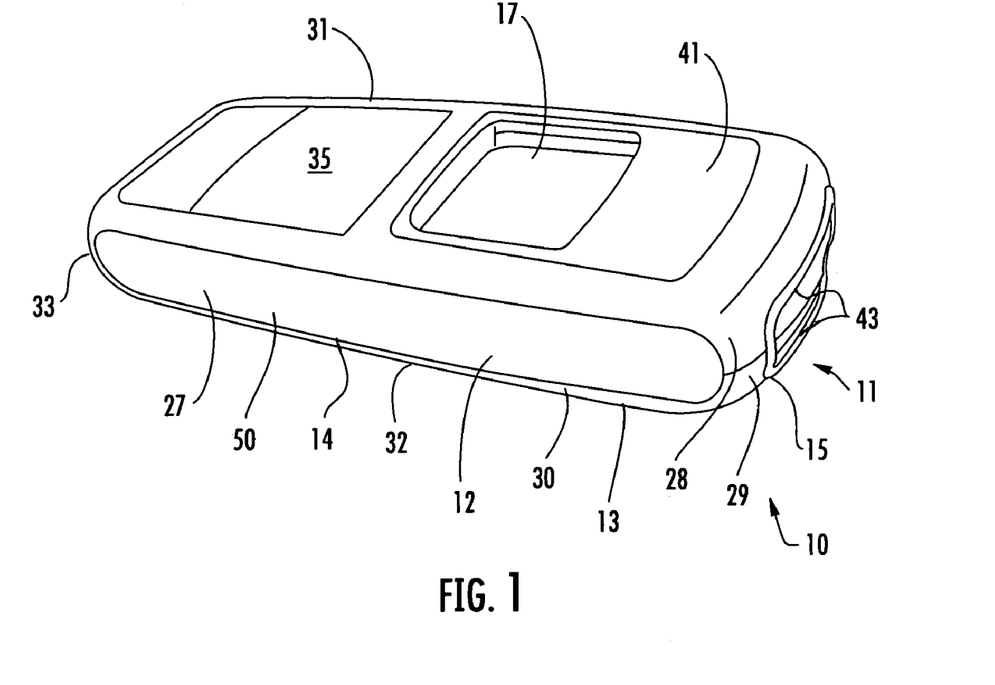
FIG. 1 is a perspective view of a mobile station of one embodiment of the present invention.

A mobile station 10 of one embodiment of the present invention is shown in FIG. 1. Included in the mobile station is a cover assembly 11 and a wireless telecommunications signal receiving and generating assembly 12. The cover assembly 11 includes a belt 13 that extends around an outer housing 14 of the signal receiving and generating assembly 12 and is secured thereabout using a connector 15. Advantageously, the cover assembly 11 protects the signal receiving and generating assembly 12 while still being easily removable and exchangeable with other cover assemblies to allow customization of the appearance of the mobile station 10.

It should be understood that the mobile telephone illustrated and hereinafter described is merely illustrative of one type of mobile station that would benefit from the present invention and, therefore, should not be taken to limit the scope of the present invention. For example, other types of mobile stations, such as portable digital assistants (PDAs), pagers, laptop computers and other types of voice and text communications systems, can readily employ the present invention. Moreover, the system and method of the present invention will be primarily described in conjunction with mobile communications applications. But the system and method of the present invention can be utilized in conjunction with a variety of other applications, both in the mobile communications industries and outside of the mobile communications industries.

Figure 2:
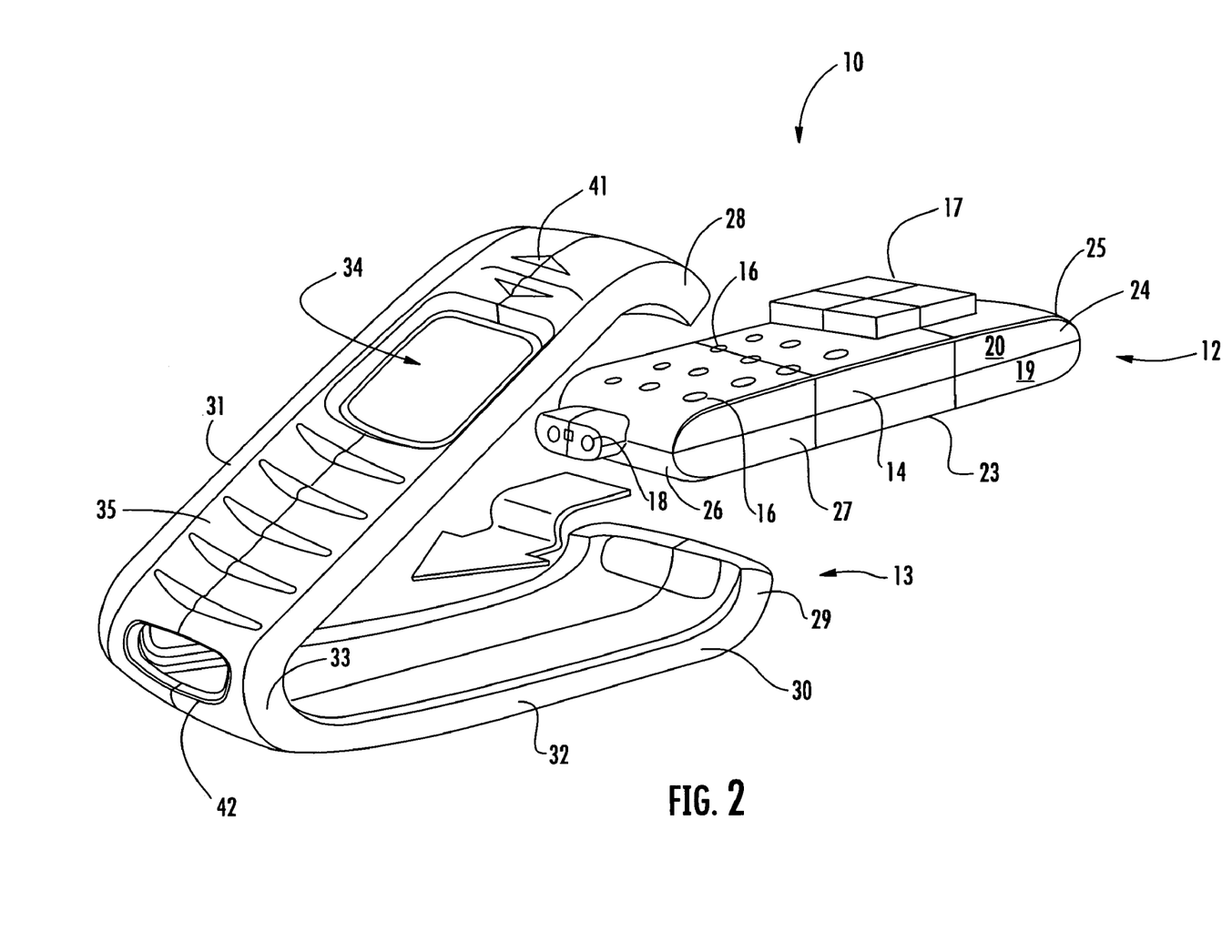
FIG. 2 is a perspective view of a belt being opened to receive a wireless telecommunications signal receiving and generating assembly of the mobile station shown in FIG. 1.

As shown in FIG. 2, the signal receiving and generating assembly 12 includes the outer housing 14, a plurality of key contacts 16, a display 17 and a interface jack 18. The signal receiving and generating assembly 12 also includes other, conventional components (battery, microphone, earpiece, processor, printed wiring board, transmitter, receiver, etc.) necessary for the mobile station to receive, process and generate wireless communications signals. However, these remaining components are conventionally known to one of skill in the art and are therefore not described or shown herein in additional detail.

In the illustrated embodiment, the housing 14 generally has a rectangular shape with a front surface 22, a back surface 23 and a peripheral surface 24 that extends between the front and back surfaces. The front surface defines a plurality of openings, including an opening through which the display 17 extends and openings through which the plurality of key contacts 16 extend, or are accessible. The back surface 23 does not define openings in the illustrated embodiment. However, various other openings may be defined in the back and other surfaces of the housing depending upon the type of mobile station and the type of access needed to the electronic, and other components, housed therein. For instance, a mobile station of the present invention that includes a headphone jack may have an opening defined in a surface of its housing 14 through which the headphone jack can be accessed.

Referring again to FIG. 2, the peripheral surface 24 includes top and bottom portions 25, 26 (wherein "top" and "bottom" are defined with respect to the orientation of the mobile station 10 in the Figures) and side portions 27. As will be described in greater detail below, the belt 13 generally extends over the entire top and bottom portions 25, 26, but leaves the side portions mostly uncovered. The top and bottom portions 25, 26 of the peripheral surface 24 have a semicircular, or rounded, shape and are on opposite ends of the housing 14. Advantageously, the rounded shape of the top and bottom portions promotes conforming contact of the belt 13 against the housing 14. The side portions 27 of the peripheral surface 24 typically have a planar shape and are also on opposite sides of the housing.

It should be noted that although the illustrated housing 14 has a generally rectangular shape, the housing may have other shapes as is necessary or advantageous for the particular intended application of the mobile station. However, the housing 14 preferably has a geometry and shape that facilitates attachment of the cover assembly 11 and cooperates therewith to provide robust protection of the more fragile (typically electronic) components of the mobile station 10. For instance, the housing may be shaped like a disc with rounded edges so that the belt 13 could extend substantially around the disc, or a cylinder wherein the belt extends over the curved surface of the cylinder.

Typically the housing 14 will be divided into two or more components that can be disengaged from each other to reveal the remaining components of the signal receiving and generating assembly 12 housed therein. Such access advantageously allows for maintenance and replacement of electronic components, batteries, etc. For instance, the housing 14 of the embodiment illustrated in FIG. 2 is divided into two components including a back component 19 and a face component 20 that together form the housing. The face component includes the entire front surface 22 and portions of the peripheral surface 24. The back component 19 includes the entire back surface 23 and portions of the peripheral surface.

It should be noted that the housing 14 could be constructed of more, or fewer, components than the illustrated embodiment. In addition, the housing 14 could be divided into components at different places, such as by a seam extending through the front and back surfaces 22, 23 which divides the housing into top and bottom components. Generally, however, fewer components are preferred for improved impact resistance.

During attachment, the two components are brought together at the peripheral surface 24 portions to form a seam that extends around the entire peripheral surface. The two components 19, 20 are typically held together using an interference or snap fit that employs latches and may be aided by the use of fasteners. However, sole use of an interference fit is advantageous because it allows the housing 14 to be easily opened without tools to remove the fasteners. Further advantageously, the belt 13 facilitates the sole use of an interference or latch fit because it holds the components together during an impact which might otherwise separate components attached solely via an interference or latch fit.

Both the back and the face components 19, 20 are preferably constructed of a relatively hard plastic material that is both light weight and protective. Preferably, the material has a relatively uniform thickness and hardness so that the belt 13 adds to the impact resistance of the mobile station 10. However, the thickness, hardness and other mechanical properties of the housing 14 could be increased in areas not covered by the belt, such as the side portions 27 which may be subject to direct impacts. Alternatively, the mechanical properties of the housing could be reduced in the areas protected by the belt, for cost, weight or other reasons.

Referring again to FIG. 2, the housing 14 may also include plateau portions that extend outwards from the base surface of the housing. For instance, the interface jack 18 of the illustrated embodiment is accessible through openings defined in a raised rectangular island defined at the bottom portion 26 of the peripheral surface 24 of the housing. Such plateau portions preferably have a height that is about equal the thickness of the belt 13 so that a top surface of the plateau portion is flush with an outer surface of the belt. As result, the plateau portion provides better visibility, and easier access, through its matching opening in the belt 13. In another option, a device may itself extend outwards through the opening in the housing 14 and thereby form its own plateau portion. For example, the display 17 of the illustrated embodiment extends outwards from the base surface of the housing 14 and has an outer surface that is flush with the outer surface of the belt 13.

The key contacts 16 are positioned in an array on the front surface 22 and each of the key contacts performs one or more allotted input functions, such as entry of a number for dialing or paging through menu selections. The key contacts 16 may either be accessible through openings in the outer housing 14, or the outer housing itself may have part of its front surface 22 formed of a printed wiring board directly supporting the key contacts 16. Such printed wiring boards typically employ metal dome contacts to register depression of overlying keys. Movement of such dome contacts upon the application of pressure is preferably in fractions of a millimeter, allowing relatively light pressure to register an input.

It should be noted that in addition to the metal dome type contacts 16, other key contact devices could be used to sense an application of pressure. For instance, piezoelectric tablets could be positioned so as to record key depressions. Therefore, the term "key contacts" as used herein in reference to the wireless signal processing assembly, and its component parts, refers to a device, or collection of devices, or other structure capable of recording the application of pressure, typically produced by the depression or actuation of one or more keys, for the purpose of registering an input to the processing assembly.

The belt 13 includes a first end 28, a second end 29 and a pair of side edges 30. The side edges 30 extend between the ends 28, 29 and the edges and ends collectively define a belt of material that can be secured around the signal receiving and generating assembly 12. The belt has several advantages but two of its primary advantages are adding another layer of protection to the housing 14 of the signal receiving and generating assembly 12, and allowing easy exchangeability with other belts for changes in the aesthetic appearance of the mobile station 10.

Figure 3:
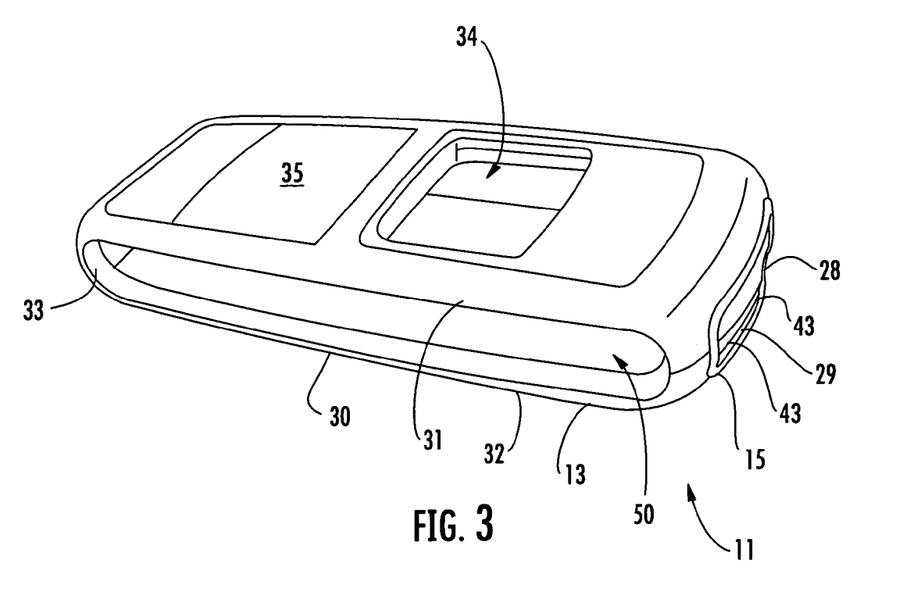
FIG. 3 is a perspective view of the belt and a connector of the mobile station shown in FIG. 1.

Referring to the embodiment of the belt 13 illustrated in the Figures, and in particular best illustrated FIGS. 2 and 3, a first portion 31 of the belt is adjacent the first end 28 and a second portion 32 of the belt is adjacent the second end 29. A flexible portion 33 of the belt 13 separates the first and second portions 31, 32. As a result, the first portion 31 extends between the first end 28, the flexible portion 33 and the side edges 30. The second portion 32 extends between the second end 29, the flexible portion 33 and the side edges 30.

A range of materials may be used to construct the belt 13. For instance, the belt may be constructed of one, or combinations of, textile materials (e.g., leather, woven or knitted materials), thermoplastics, rubber, silicone, etc., but is preferably constructed of a single material having elastic properties. Materials having elastic properties have the advantage of dampening and absorbing energy from the types of sudden impacts that break open relatively hard plastic housings and damage the delicate electronics held inside the housing. In addition, elastic materials facilitate attachment of the belt around the signal receiving and generating assembly 12 by allowing the ends 28, 29 to be drawn together. Further, the belt materials can be selected to be aesthetically pleasing, such as by including patterns, luminescence, reflective qualities, colors, images, indicia or other visible depictions or characteristics. Examples of a preferred material includes a two-shot elastomer wherein the color and material properties can be varied at specific locations along the belt. As another example, the belt may be constructed of fabric with rubber trim.

In the illustrated embodiment, the first and second portions 31, 32 are both generally flat and have a similar rectangular shape. The first portion 31 is sized and shaped to overlie the entire front surface 22 of the housing 14, while the second portion 32 is sized and shaped to overlie the entire back surface 23. In order to accommodate the display 17 extending from the front surface 22 of the housing 14, the first portion 31 defines a display opening 34 having a rectangular shape similar to the display and sized to extend around the periphery of the display. As another option, the first portion 31 defines a pair of audio openings 41 positioned above the display opening 34 so as to overlie audio output speakers of the signal receiving and generating assembly 12.

Other openings may also be defined in the first portion 31 (and other portions) of the belt 13 depending upon different factors such as the number and kind of input and output devices used with the mobile station 10. For instance, if the mobile station is a wireless MP3 player, openings in the first portion 31 may allow passage therethrough of various headphone and external speaker connections.

The first portion 31 may also include a key pad 35 that is positioned to overlie the key contacts 16 of the signal receiving and generating assembly 12. The key pad 35 preferably includes multiple keys 37 each positioned above one or more plungers 36, as shown by the cross-sections of FIGS. 5 and 6. In turn, each of the plungers is positioned above one of the key contacts 16. Preferably, the key pad 35 is integrally constructed of the same material as the remainder of the belt 13, and further preferably is constructed of a semi-soft, flexible material.

Figure 5:
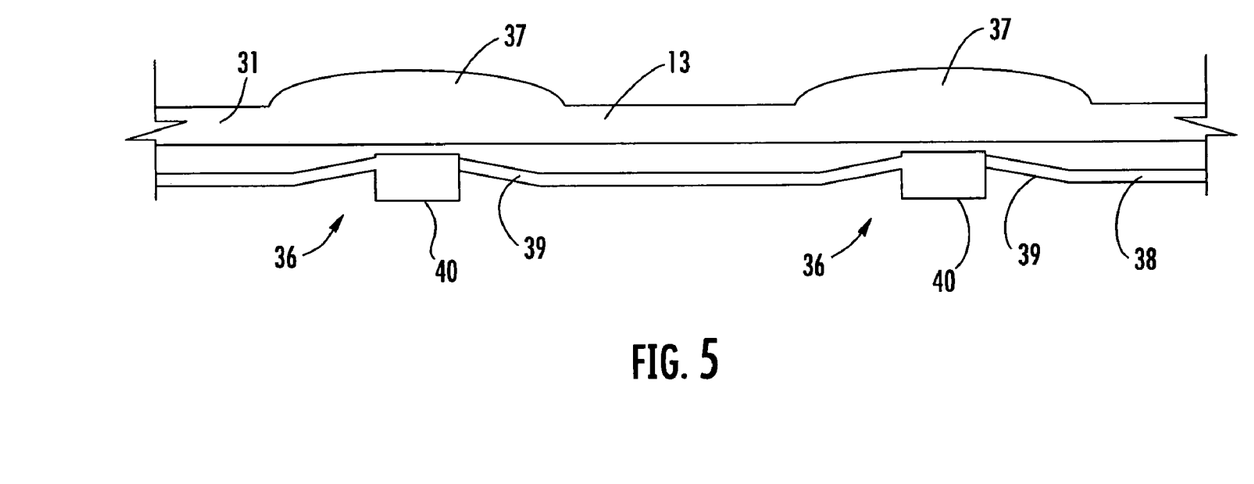
FIG. 5 is a cross-sectional view of one embodiment of a key pad and plunger mat of the mobile station shown in FIG. 1.
Figure 6:
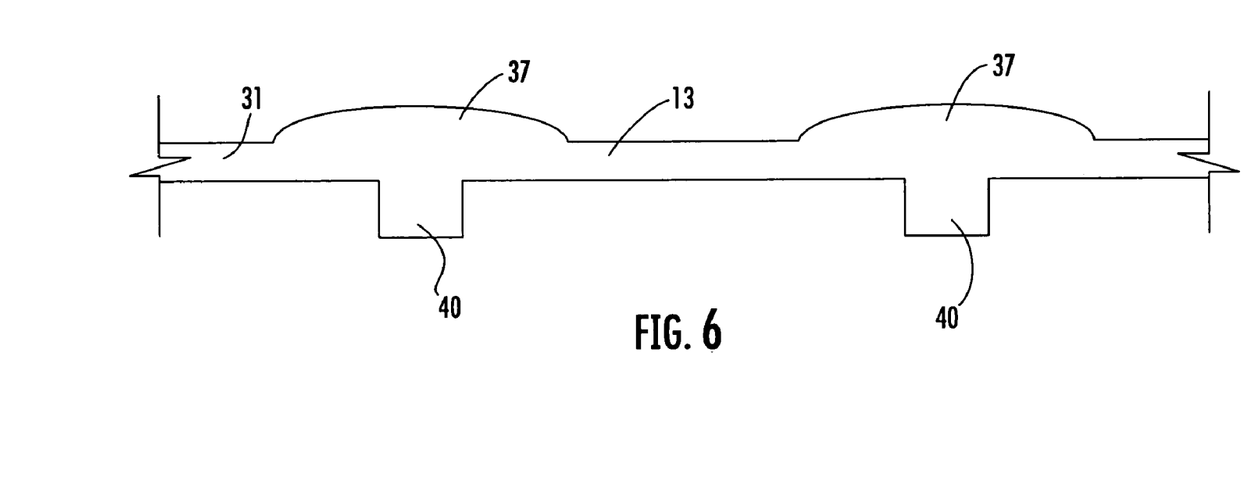
FIG. 6 is a cross-sectional view of another embodiment of a key pad of the belt of the mobile station shown in FIG. 1.
Figure 7:
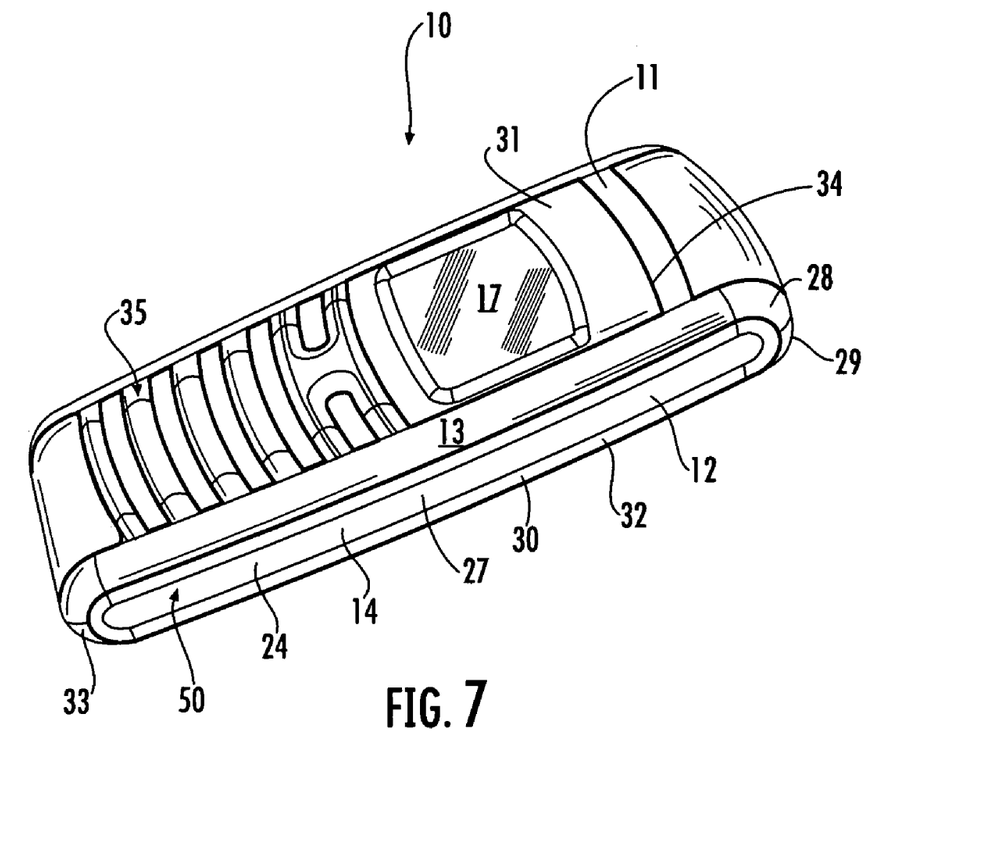
FIG. 7 is a perspective view of a mobile station of another embodiment of the present invention.

The plungers 36 may be part of a separate plunger mat 38, as shown in FIG. 5, wherein each of the plungers includes a resilient diaphragm portion 39 biasing a plunger cylinder 40 into a position adjacent the underside of the key pad 35. In another example, the key pad 35 may include integrated plungers, as shown in FIG. 6, wherein the plunger cylinder 40 is a part of a respective one of the keys. The latter embodiment is particularly suited to keys constructed of a resilient, elastic material that allows the keys to deform relative to the rest of the key pad 35 and belt 13. During use, the plunger cylinder 40 is advanced into contact with a respective one of the underlying key contacts 16 so that an input is registered. Upon release of pressure from the key, the plunger cylinder retracts due to the bias of the diaphragm portion 39 or the resiliency of the key itself.

In yet another option, the keys may be constructed of a relatively rigid material separate from the rest of the belt 13, wherein each of the keys extends upwards through a respective one of a plurality of openings defined in the belt. Regardless of the material construction of the key pad 35 and its keys, the keys should be capable of at least some movement so that pressure is applied to the underlying one of the key contacts 16.

As shown best in FIG. 2, the first and second ends 28, 29 arc inwardly towards each other and away from the first and second portions 31, 32 of the belt 13. As a result, when the ends are held in an abutting relationship by the connector 15 they form rounded inner and outer surfaces. In addition, the flexible portion 33 which separates the first and second portions 31, 32 and extends between the side edges 30, has rounded inner and outer surfaces.

Advantageously, the rounded inner surface of flexible portion and the abutting ends corresponds with the rounded outer shape of the top and bottom portions 25, 26 of the peripheral surface 24 of the housing 14. In addition, the relatively planar inner surfaces of the first and second portions 31, 32 correspond with the planar base surfaces of the housing 14. Close correspondence of the inner surfaces of the belt 13 with the outer housing 14 promotes a robust fit around the outer housing of the cover assembly 11 for improved impact resistance. In instances in which the housing 14 is shaped differently, the belt may likewise be shaped differently so as to correspond to the housing.

The flexible portion 33 of the belt 13 is constructed of a material that is sufficiently flexible to allow movement of the first end 28 and first portion 31 with respect to the second end 29 and second portion 32. As is shown in FIG. 2, the first end 28 and first portion 31 is rotated about the flexible portion 33 away from the second end 29 and second portion 33 so that the signal receiving and generating assembly 12 can be positioned therebetween.

As with the other belt portions, the flexible portion 33 may define openings for access to the signal receiving and generating assembly 11. For instance, the flexible portion in the illustrated embodiment defines an interface jack opening 42 through which extends the interface jack 18. In particular, the interface jack opening of the illustrated embodiment is approximately rectangular and is shaped to extend around the raised interface jack 18 after the belt 13 is secured around the signal receiving and generating assembly 12, as shown in FIG. 4.

The side edges 30 of the belt 13 extend along and inwards from the lateral sides of the ends 28, 29 and the portions 31, 32 and 33. Generally, the side edges 30 of the illustrated embodiment are at a right angle to the ends and portions so as to extend over the side portions 27 of the peripheral surface 24 of the outer housing 14. However, the side edges 30 of the belt 13 may have other shapes so as to extend in general contact with the side portions 27. For example, if the side portions 27 were curved similar to the illustrated top and bottom portions 25, 26, the side edges 30 could also be correspondingly curved. In yet another alternative, the side edges 30 may be spaced from the outer housing 14, or may not extend over the side portions 27 of the peripheral surface 24 at all, instead merely defining edges of the ends 28, 29 and portions 31, 32 and 33.

When the belt 13 extends around the signal receiving and generating assembly 12, the side edges 30 of the belt 13 define a pair of side openings 50 through which the side portions 27 of the peripheral surface 24 of the housing are accessible, as shown in FIG. 1. Advantageously, the side openings 50 separate the first and second belt portions 31, 32 and allow the above-described relative movement between the portions and ends so that the belt 13 can be easily affixed around the housing 14. This is unlike conventional covers defining pockets that are formed to tightly fit about the mobile station 10, at times making it difficult to insert the mobile station into the pocket.

Figure 4:
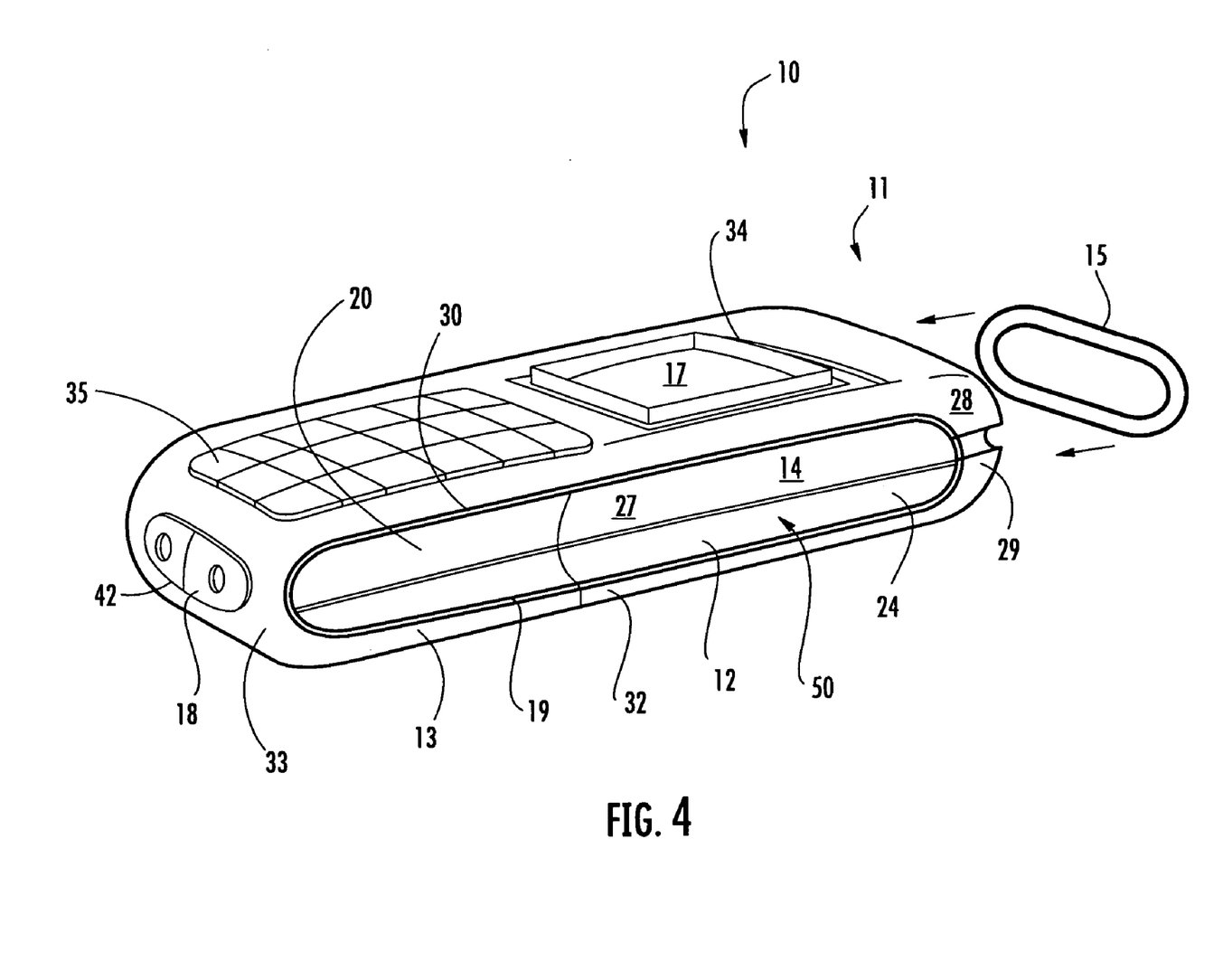
FIG. 4 is a perspective view of the connector being attached to the belt of the mobile station shown in FIG. 1.

As shown in FIG. 4, attachment of the belt 13 around the housing 14, including placement of the ends 28, 29 in abutting contact, brings each of the side edges 30 into a closed shape to define the side openings 50. Portions of the side edges 30 that are adjacent the first and second portions 31, 32 of the belt 13 define two parallel, spaced edges of the side openings 50. Portions of the sides edges 30 that are adjacent the ends 28, 29 define two opposite, rounded edges of the openings 50. Advantageously, the curved ends of the openings 50 at the flexible portion 33 and the space between the elongate sides of the openings facilitate bending of the belt 13 without crimping. Achieving a continuous wrap around the assembly 12 without kinks or crimping, while at the same time retaining a smooth and flexible appearance when removed from the assembly 12, is a key element of the present invention. The rounded edges can be pre-molded, or can be facilitated through the use of grooves or pleats, and decreases in the material thickness for when the belt extends around tight corners.

The cover assembly 11 also includes the connector 15 which holds the ends 28, 29 of the belt 13 together after the belt is extended around the housing 14. In the illustrated embodiment, the connector 15 is a continuous loop or band of elastic material that fits around a pair of connector flanges 43 positioned on the ends 28, 29 of the belt 13, as shown in FIGS. 1 and 4. In the illustrated embodiment, the connector flanges 43 are formed by a recessed channel extending through the ends 28, 29 of the belt 13. Advantageously, the recessed channel partially conceals the connector 15 for an improved aesthetic appearance. Although in the illustrated embodiment the flanges 43 are formed by a recess in the belt 13, the flanges 43 can also be defined by opposing raised portions of the belt extending outwards from the base surface at the ends 28, 29.

It should be noted that other types of connectors 15 can be used to secure the ends 28, 29 of the belt 13 together. For instance, hook and loop connectors, latches, buckles, snaps, etc., could be used as long as they can effectively hold the ends of the belt together, especially if the belt is under tension. It should also be noted that the ends 28, 29 need not be located at any particular portion of belt 13, and for instance could define a seam within the first or second portions 31, 32. As another option, the belt 13 may be constructed of an elastic material that is a continuous loop defining the side openings 50 but not having the ends 28, 29. However, the belt material must be sufficiently elastic to allow the belt to be distended and looped around the housing 14.

During use, the belt 13 of the illustrated embodiment is opened by rotating the first end 28 and first portion 31 away from the second end 29 and second portion 32, as shown in FIG. 2. Then, the signal receiving and generating assembly 12 is inserted between the first and second portions 31, 32. If necessary, any openings defined in the belt 13 are positioned over corresponding plateau regions on the housing 14. For instance, the display opening 34 is positioned over the display 17 and the interface jack opening 42 is positioned over the interface jack 18. Further, the keys 37 of the key pad 35 are positioned over corresponding ones of the key contacts 16.

After insertion of the signal receiving and generating assembly 12, the ends 28, 29 of the belt 13 are brought together so that the inner surfaces of the belt are generally in overlying contact with the base surfaces of the housing 14. Once the ends are adjacent to each other (but may still have a gap as shown in FIG. 4), the elastic band connector 15 is looped over the connector flanges 43. Tension in the connector draws the ends 28, 29 into an abutting relationship. Other belts having different colors, aesthetic elements or configurations could be exchanged with the current belt by reversing the aforedescribed process to remove the current belt.

Figure 8:
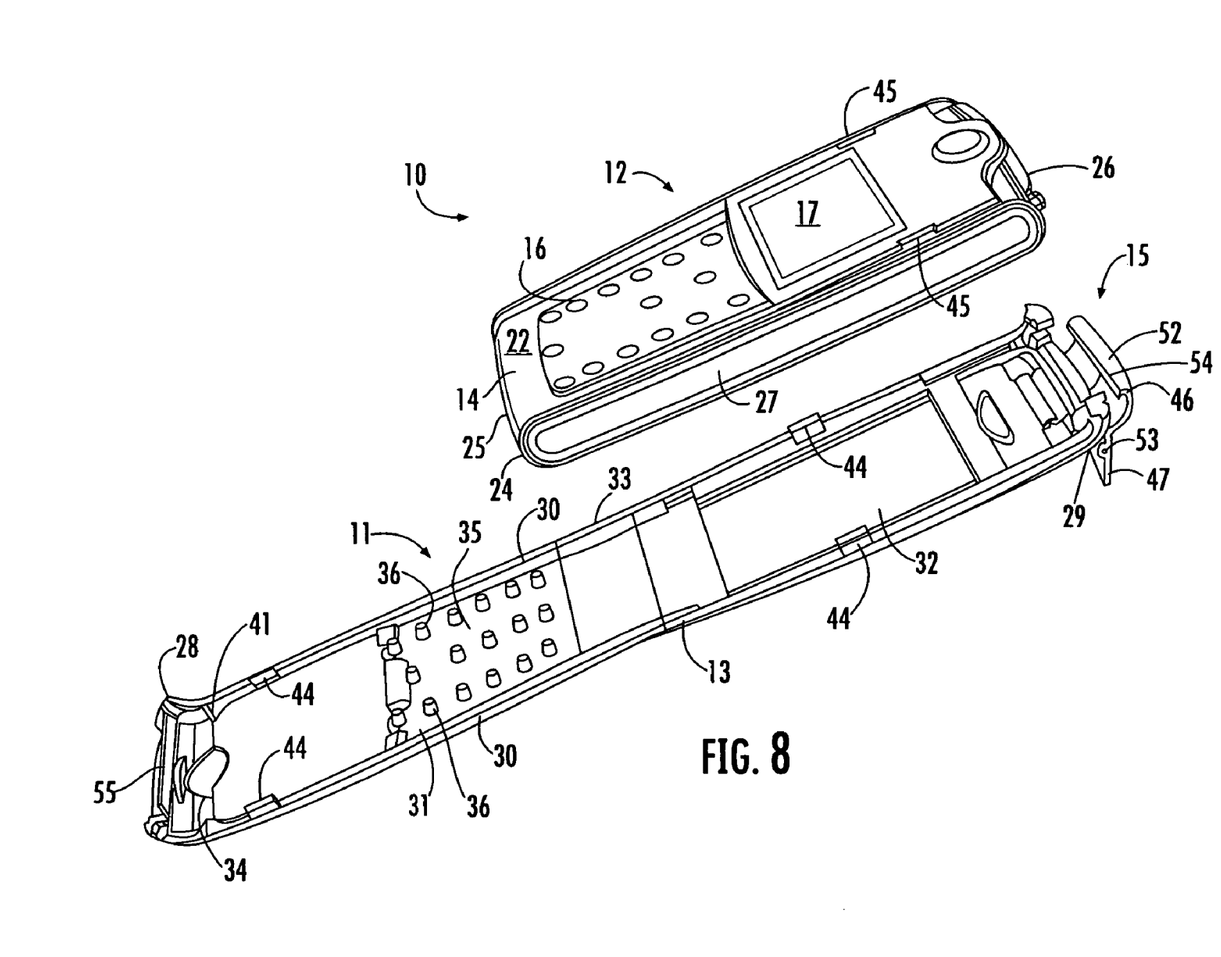
FIG. 8 is an exploded view of the mobile station of FIG. 7.

Another embodiment of the mobile station 10 and associated cover assembly 11 of the present invention is shown in FIGS. 7–12. As is best illustrated in FIG. 8, the belt 13 can include an integrated keypad 35 having keys 37 on its outer surface and corresponding frusto-conical shaped plungers 36 on its inner surface. Each of the plungers 36 is positioned to correspond to respective ones of the key contacts 16 and extend through openings defined in the housing 14.

Figure 10:
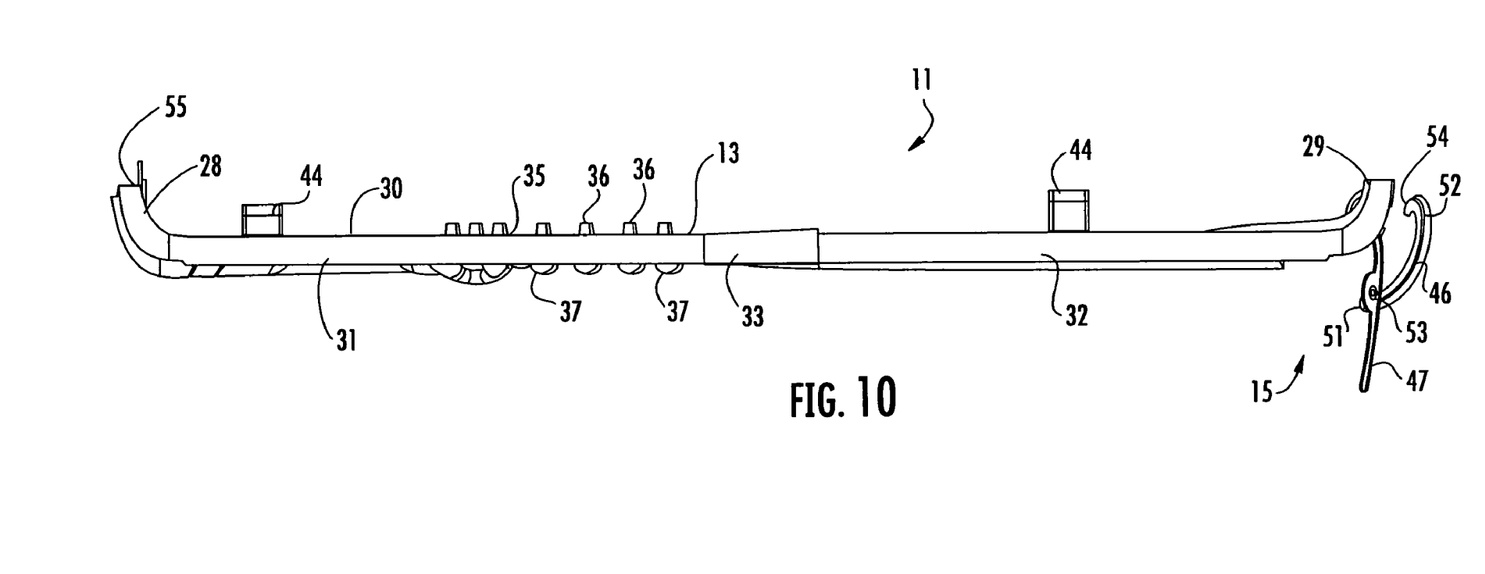
FIG. 10 is a side elevation view of a cover assembly of the mobile station of FIG. 7.

In addition, the belt may include pairs of clip members 44 wherein the clip members are spaced across the belt 13 and extending upwards from the side edges 30 of the belt at the first and second portions 31, 32, as shown in FIG. 10. Optionally, the first and second portions, and the clip members 44, are constructed of a relatively stiff material, such as a metal or plastic material. In this manner, the clip members may be resiliently biased towards each other so as to grip the housing 14. As another option, the housing 14 may define pairs of clip receptacles 45, as shown in FIG. 8, sized and shaped to receive the clip members 44 and more firmly hold the belt 13 to the signal receiving and generating assembly. In another aspect, the clip members 44 may extend along nearly entire portions 31, 32 of the belt so as to form extended fins that fit into similarly extended receptacles 45.

Figure 9:
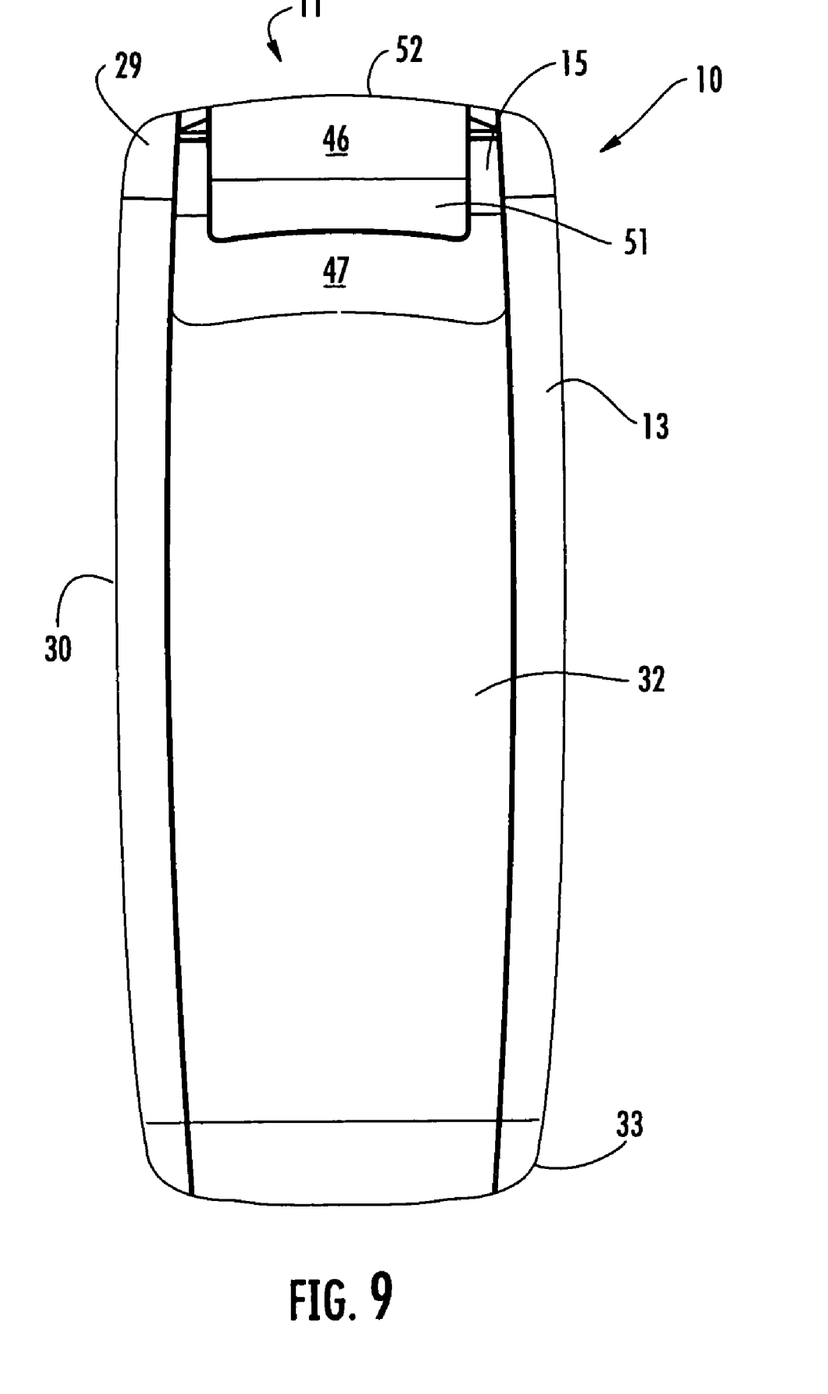
FIG. 9 is a side elevation view of the mobile station of FIG. 7 including a latch and lever connector.

The connector 15 of the embodiment illustrated in FIGS. 7–12 includes a latch 46 and a lever 47 that cooperate to secure the belt 13 about the signal receiving and generating assembly 12. As can be seen in FIG. 9, the lever 47 may have a U-shape with a pair of arms extending towards a top end (using the illustrated orientation) of the mobile station 10. The ends of the arms of the lever 47 are rotatably connected to the second end 29 of the belt 13 via a first pin 48 extending therethrough, as can be seen in the cross-sectional view of FIG. 11.

Figure 11:
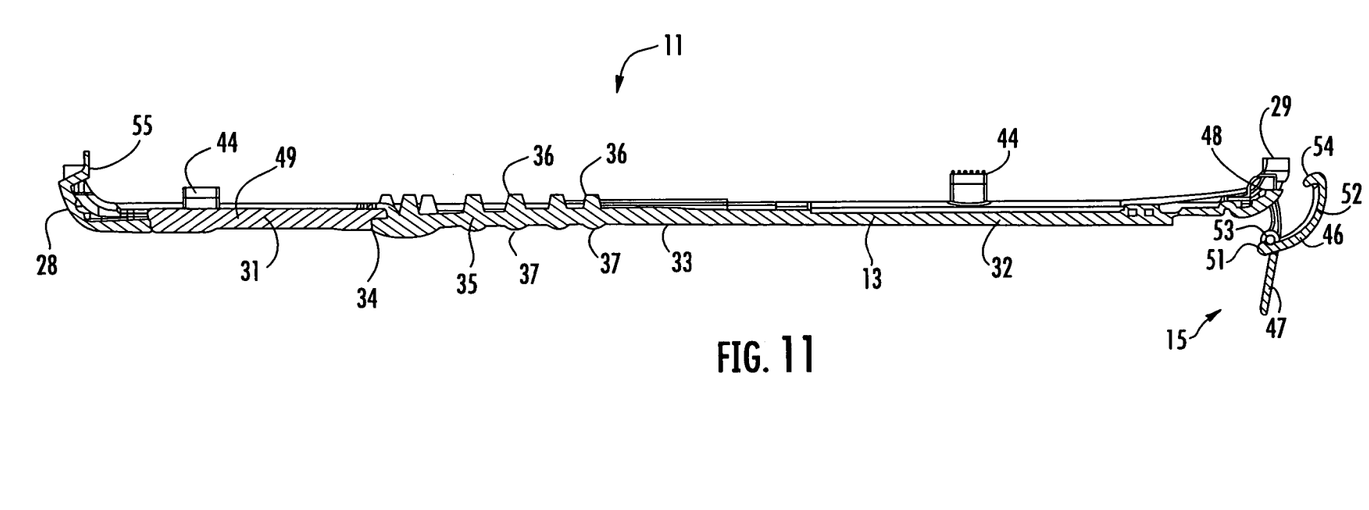
FIG. 11 is a cross-sectional view of the cover assembly of FIG. 10.

The open area defined between the arms of the lever 47 provides clearance for the latch 46 which extends therebetween. As is shown in FIGS. 10 and 11, the latch has a rounded contour and extends from a first latch end 51, that is rotatably connected to the arms of the lever 47 via a second pin 53, to a second latch end 52. At the second end, the latch 46 includes a hook portion 54 that extends away from its convex side.

Figure 12:
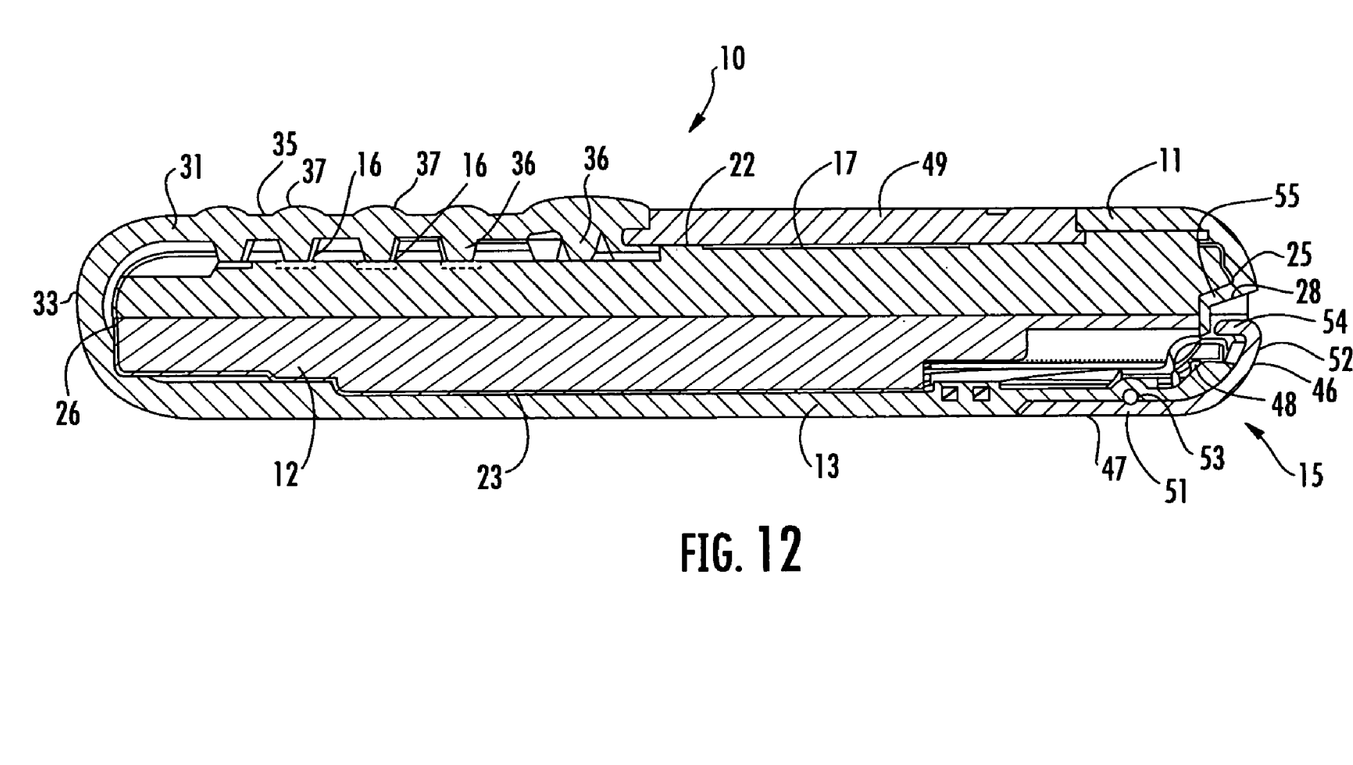
FIG. 12 is a cross-sectional view of the mobile station of FIG. 7.

At the first end 28 the belt 13 may define a notched portion 55 that extends into a connector opening 56 defined in the housing 14 when the cover assembly 11 is secured thereto, as shown by the cross-section of FIG. 12. In particular, the notched portion 55 has leg extending inwards and another leg attached to the first leg and extending at about a 90° (or greater) angle therefrom into a position below the hook portion 54. As another option, the belt 13 may include a display cover 49 that extends over the display and is transparent to allow visibility of the display therethrough.

During assembly, the belt 13 is attached around the housing 14 with the ends 28, 29 brought together at the top portion 24 of the housing. The notched portion 55 of the first end 28 is inserted into the connector opening 56 and the hook portion 54 is positioned over a proximate edge of the housing 14 defining the connector opening. Then, the lever 47 is rotated downwards about the first pin 48, and causing rotation at the second pin 53 between the latch 46 and the lever. As the lever is depressed into a flush position with respect to the outer surface of the belt 13, tension is applied through the latch 46 against the proximate edge or the housing 14 to further secure the belt 13 to the housing 14.

The mobile station and associated cover assembly of the present invention have many advantages. For instance, the belt 13 is easily attached and removed from the signal receiving and generating assembly, allowing quick exchange with other belts to change the appearance of the mobile station 10. In addition, the cover assembly 11 provides additional protection for the signal receiving and generating assembly 12, especially if the belt 13 is constructed of an impact-absorbing material. The side edges 30 of the belt defining the side openings 50 allow the mobile station 10 to be easily gripped and held in the hand of a user. In addition, the side openings allow for easier bending and attachment of the belt 13 about the housing 14. Matching the thickness of the belt 13 to the raised portions, such as the display 17 and the interface jack 18, provide a relatively flush, attractive outer surface of the mobile station 10.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile station assembly comprising:
   a wireless telecommunications signal receiving and generating assembly having a front surface, a back surface and a peripheral surface extending between the front and back surfaces; and
   a belt, in a closed configuration, extending over and in contact with the front surface, the back surface and a pair of opposite portions of the peripheral surface of the signal receiving and generating assembly, said belt having a pair of side edges defining a pair of openings on opposite sides of the belt when the belt is in the closed configuration wherein the openings reveal the remaining portions of the peripheral surface of the signal receiving and generating assembly.

2. A mobile station assembly of claim 1, wherein the wireless telecommunications signal receiving and generating assembly includes an outer housing having at least one plateau portion extending outwards from a base surface.

3. A mobile station assembly of claim 2, wherein the belt is positioned against the base surface of the housing and defines at least one opening through which the plateau portion extends.

4. A mobile station assembly of claim 3, wherein the belt has an outer surface that is flush with a surface of the plateau portion.

5. A mobile station assembly of claim 4, wherein the plateau portion comprises a display.

6. A mobile station assembly of claim 4, wherein the plateau portion comprises a connection port.

7. A mobile station assembly of claim 1, wherein the belt includes a pair of ends and wherein the mobile station assembly further includes a connector securing the ends of the belt in an abutting relationship.

8. A mobile station assembly of claim 1, wherein the connector includes a lever rotatably connected to a second end of the belt and a latch rotatably connected to the lever.

9. A mobile station assembly of claim 8, wherein the housing defines a connector opening and wherein the latch includes a hook end configured to extend into the connector opening and engage an edge of the housing defining the connector opening.

10. A mobile station assembly of claim 9, wherein a first end of the belt defines a notched portion that extends into the connector opening defined in the housing.

11. A mobile station assembly comprising:
    a wireless telecommunications signal receiving and generating assembly having a front surface, a back surface and a peripheral surface extending between the front and back surfaces; and
    a belt extending over the front surface, the back surface and a pair of opposite portions of the peripheral surface of the signal receiving and generating assembly, said belt having a pair of side edges defining a pair of openings on opposite sides of the belt wherein the openings reveal the remaining portions of the peripheral surface of the signal receiving and generating assembly,
    wherein the belt includes a pair of ends and wherein the mobile station assembly further includes a connector securing the ends of the belt in an abutting relationship, and wherein each of the ends of the belt defines an outwardly directed flange and wherein the connector comprises a ring of elastic material configured to extend around the flanges so as to hold the ends of the belt together.

12. A method of securing a belt around a wireless telecommunications signal receiving and generating assembly, said method comprising:
   separating a pair of ends of the belt by rotating a first portion of the belt away from a second portion of the belt about a flexible portion of the belt;
   inserting the signal receiving and generating assembly between the first and second portions of the belt;
   closing the ends of the belt until the first and second portions of the belt overlie the signal receiving and generating assembly and the ends of the belt are in an adjacent relationship; and
   securing the ends of the belt together using a connector.

13. A method of claim 12, wherein securing the ends of the belt include distending an elastic band of the connector and positioning the elastic band around a pair of flanges wherein each of the flanges is defined on a respective one of the ends of the belt.

14. A method of claim 12, wherein inserting the signal receiving and generating assembly includes positioning a display and a plurality of key contacts of the signal receiving and generating assembly in registration with a display opening defined by the belt and a keypad of the belt, respectively.

15. A method of claim 12, wherein securing the ends of the belt include urging the ends of the belt together in an abutting relationship.

16. A method of claim 12, wherein securing the ends of the belt includes rotating a lever with respect to the belt so as to urge a latch against the signal receiving and generating assembly.

* * * * *